(12) United States Patent
Bui et al.

(10) Patent No.: US 9,071,554 B2
(45) Date of Patent: Jun. 30, 2015

(54) TIMESTAMP ESTIMATION AND JITTER CORRECTION USING DOWNSTREAM FIFO OCCUPANCY

(71) Applicant: Cisco Technology, Inc., San Jose, CA (US)

(72) Inventors: Luan Bui, San Jose, CA (US); Murali Chundi, San Jose, CA (US); Subramani Ganesh, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 189 days.

(21) Appl. No.: 13/832,072

(22) Filed: Mar. 15, 2013

(65) Prior Publication Data

US 2014/0269749 A1 Sep. 18, 2014

(51) Int. Cl.
*H04L 12/863* (2013.01)
(52) U.S. Cl.
CPC .................................. *H04L 47/622* (2013.01)

(58) Field of Classification Search
CPC ...................................................... H04L 47/622
See application file for complete search history.

(56) References Cited

U.S. PATENT DOCUMENTS

| | | | |
|---|---|---|---|
| 2008/0089364 A1* | 4/2008 | Barry et al. | 370/517 |
| 2010/0150182 A1* | 6/2010 | Noronha, Jr. | 370/537 |
| 2012/0082156 A1* | 4/2012 | Swartzentruber et al. | 370/389 |

* cited by examiner

*Primary Examiner* — Jae Y Lee
(74) *Attorney, Agent, or Firm* — Merchant & Gould P.C.

(57) ABSTRACT

First, a packet may be received and a timestamp value may be placed on the packet. The timestamp value may comprise a place time value comprising a time when the timestamp was placed on the packet plus a delay time value comprising an estimated time delay between when the timestamp was placed on the packet and when the packet leaves a port exit. Next, the packet may be sent to a first in first out (FIFO) memory. The packet may then be sent from the FIFO memory out the port exit.

22 Claims, 3 Drawing Sheets

US 9,071,554 B2

TIMESTAMP ESTIMATION AND JITTER CORRECTION USING DOWNSTREAM FIFO OCCUPANCY

BACKGROUND

A router is a device that forwards data packets between computer networks, creating an overlay internetwork. A router is connected to two or more data lines from different networks. When a data packet comes in one of the lines, the router reads the address information in the packet to determine its ultimate destination. Then, using information in its routing table or routing policy, it directs the packet to the next network on its journey. Routers perform the "traffic directing" functions on the Internet. A data packet is typically forwarded from one router to another through the networks that constitute the internetwork until it reaches its destination node.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
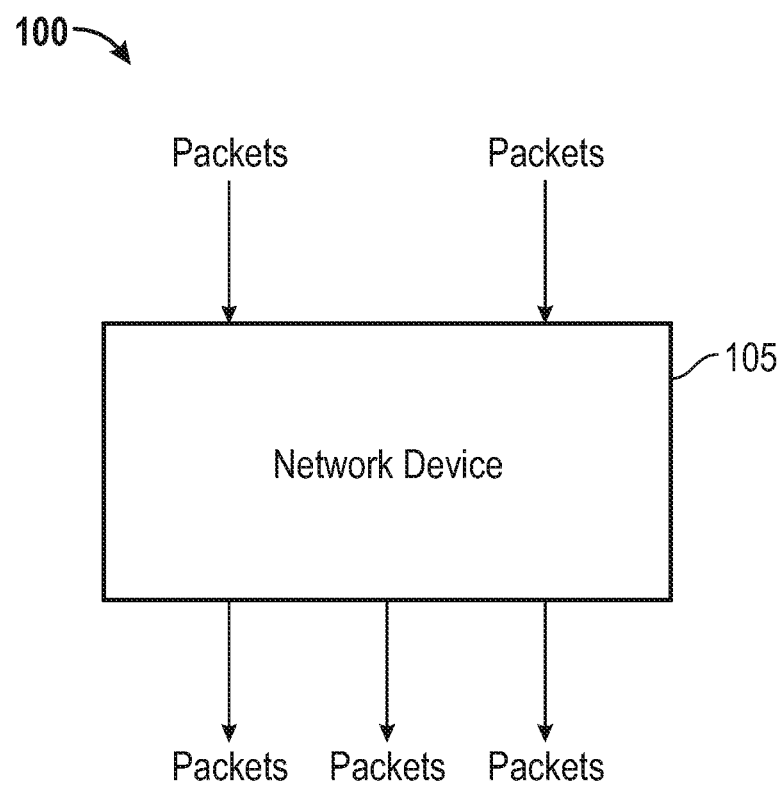
FIG. 1 is a block diagram of an operating environment.

First, a packet may be received and a timestamp value may be placed on the packet. The timestamp value may comprise a place time value comprising a time when the timestamp was placed on the packet plus a delay time value comprising an estimated time delay between when the timestamp was placed on the packet and when the packet leaves a port exit. Next, the packet may be sent to a first in first out (FIFO) memory. The packet may then be sent from the FIFO memory out the port exit.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 is a block diagram of an operating environment 100. As shown in FIG. 1, environment 100 may include network device 105. Network device 105 may comprise a router, a network switch, a hub, or any device configured to pass data packets through a network such as the Internet. For many applications, packets may be timestamped before they are sent out of network device 105. Network device 105 may provide timestamp accuracy and jitter correction in a scalable fashion for a system with several ports.

Network device 105 may include an Application Specific Integrated Circuit (ASIC) where packet timestamping may occur. In conventional packet timestamping, the timestamp may not be accurate because the packet may be delayed by going through some first in first out (FIFO) memories and other logic before it exits the networking device's port. This delay between when the time stamp was applied and when the packet actually exits may cause the timestamp to be inaccurate resulting in a loss of timestamp.

One way to achieve accurate timestamping is to timestamp the packet as close as possible to the packet's egress port on the networking device. Consequently, with this solution, every egress port would need timestamping logic. This solution may not be desirable because, if the device has N ports, the timestamping logic would need to be replicated N times. This would not be scalable since this increases cost in terms of gate-count and power utilization.

Because there may always be some logic and FIFOs present between the timestamping point within the device and the port exit, loss in timestamp accuracy may occur. Estimating and utilizing an estimate of the "delta" delay between the timestamping point and the time when the packet actually exits the port may provide a scalable and efficient solution.

Figure 2:
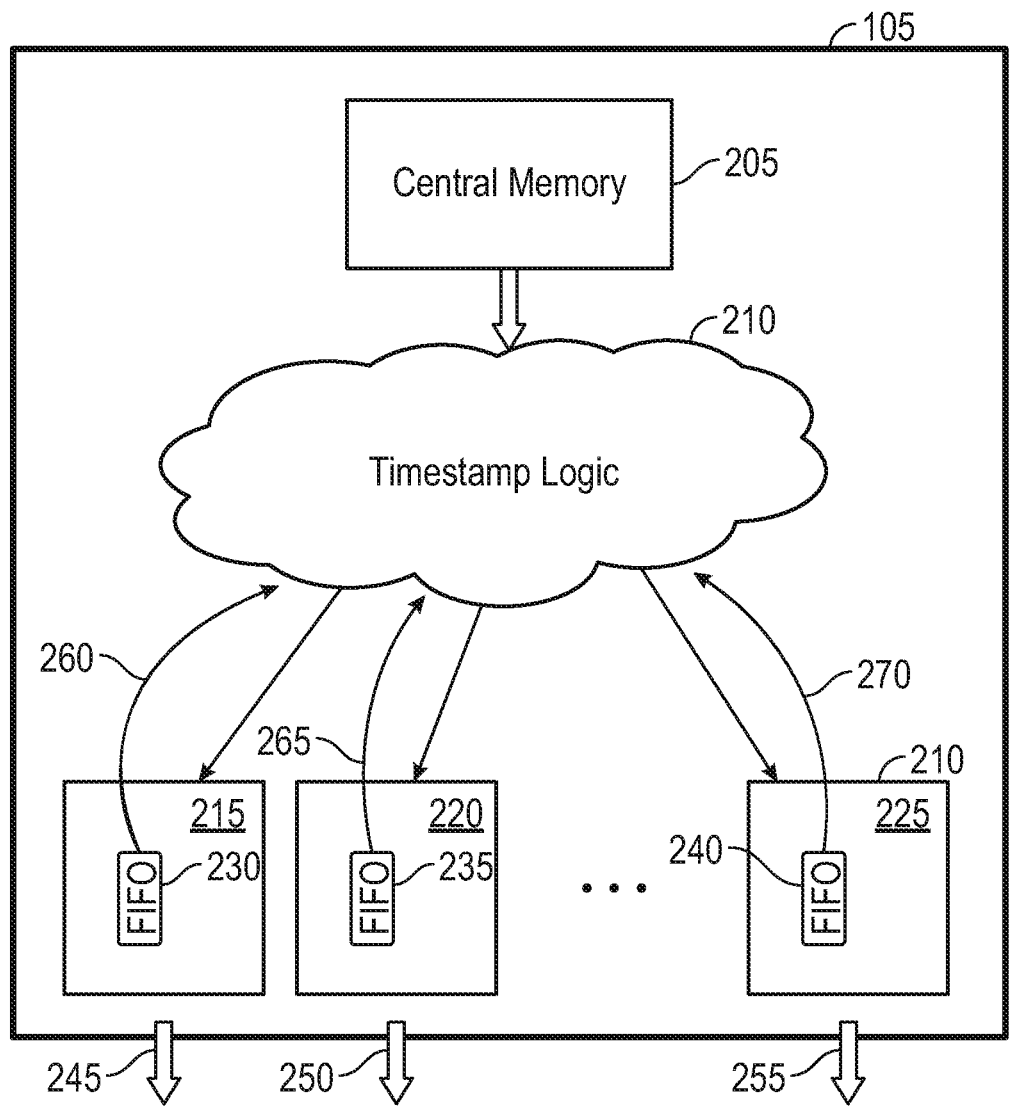
FIG. 2 is a block diagram of a network device.

FIG. 2 shows network device 105 in more detail. As shown in FIG. 2, network device 105 may comprise a central memory 205, timstamping logic 210, a first port element 215, a second port element 220, and a third port element 225. These components may, for example, be located within an ASIC included in networking device 105. First port element 215, second port element 220, and third port element 225 may respectively comprise a first FIFO memory 230, a second FIFO memory 235, and a third FIFO memory 240. In addition, first port element 215, second port element 220, and third port element 225 may respectively comprise a first port exit 245, a second port exit 250, and a third port exit 255. First feedback channel 260, second feedback channel 265, and third feedback channel 270 may respectively provide timestamping logic 210 with depth feedback corresponding to FIFO depths of first FIFO memory 230, second FIFO memory 235, and third FIFO memory 240.

As packets arrive at network device 105, they may be stored in central memory 205. Packets may be read out of central memory 205 before they are sent to their respective egress ports (e.g. port exits) of networking device 105. Timstamping logic 210 may comprise circuitry configured to apply timestamps consistent with embodiments of the disclosure. All packets may be timestamped at one single, centrally located point in network device 105 (e.g. within the ASIC) immediately after central memory 205. This central timestamping approach may be scalable in a multi-port system because only one timestamping logic may be used. Also, with just one central timestamping logic rather than timestamping logic for every egress port, gate-count and power utilized may be reduced. Furthermore, timestamping accuracy (e.g. to provide jitter correction) may be improved with FIFO depth feedback from respective egress ports (e.g. port exits) fed to timstamping logic 210.

Figure 3:
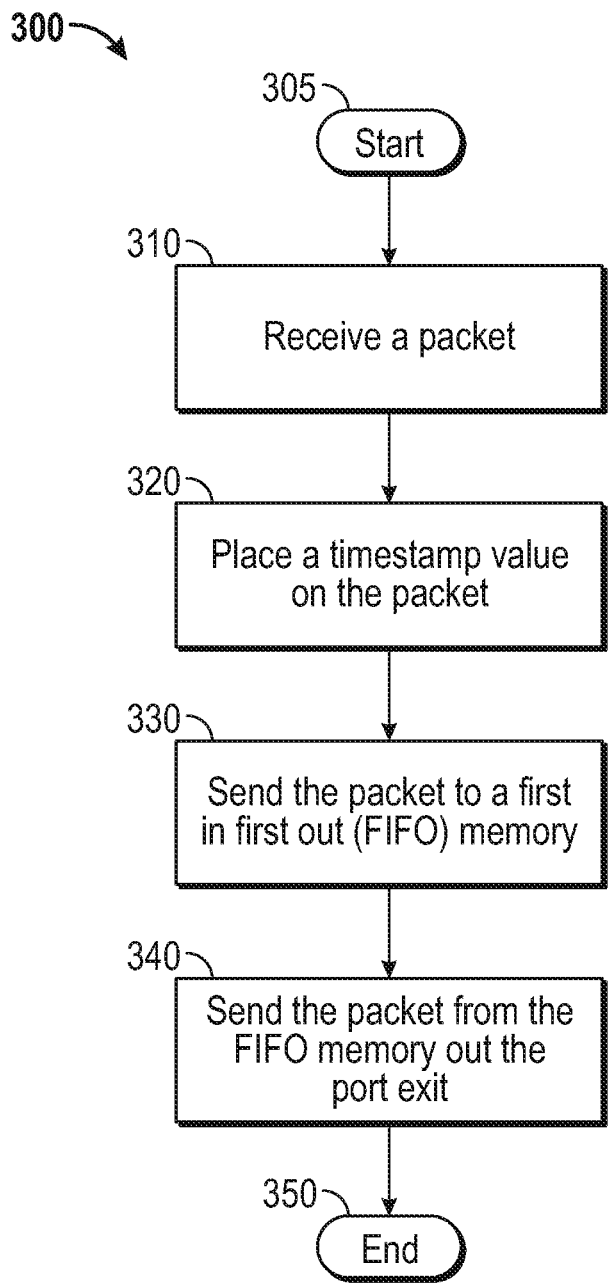
FIG. 3 is a flow chart of a method for providing timestamping.

FIG. 3 is a flow chart setting forth the general stages involved in a method 300 consistent with an embodiment of the disclosure for providing a timestamp. Method 300 may be implemented using a network device 105 as described in more detail below with respect to FIG. 2. Ways to implement the stages of method 300 will be described in greater detail below.

Method 300 may begin at starting block 305 and proceed to stage 310 where network device 105 may receive a packet. For example, as packets arrive at network device 105, they may be stored in central memory 205. Packets may be read out of central memory 205 before they are sent to first port exit 245, second port exit 250, or third port exit 255.

From stage 310, where network device 105 receives the packet, method 300 may advance to stage 320 where network device 105 may place a timestamp value on the packet. The timestamp value may comprise a place time value comprising a time when the timestamp was placed on the packet (e.g. a current time) plus a delay time value comprising an estimated time delay between when the timestamp was placed on the packet and when the packet leaves an exit port on network device 105 (e.g. first port exit 245.) For example, the delay time value may comprise one or the sum of two or more of: i) a variable delay; ii) a fixed logic delay; and iii) an outstanding packet delay. For example:

timestamp value=place time value+delay time.

place time value=a time when the timestamp was placed on the packet.

delay time=variable delay+fixed logic delay+outstanding packet delay.

The variable delay may correspond to a delay caused by constantly varying FIFO depths (e.g. in first FIFO memory 230) between the point of timestamping (e.g. time stamping logic 210) and a port exit (e.g. first port exit 245). To determine an estimate for the variable delay, network device 105 may feed dynamic FIFO depths (i.e. current occupancy of the downstream FIFOs) of the downstream FIFOs (e.g. first FIFO memory 230 second FIFO memory 235, and third FIFO memory 240) back to time stamping logic 210 over first feedback channel 260, second feedback channel 265, and third feedback channel 270 respectively. The FIFO depths may comprise the number of bytes that are currently occupied in the respective FIFO memory. This can be multiplied by a correction coefficient to arrive at the variable delay. Each exit point may have different delay characteristics, thus the correction coefficient may be different on a per exit point basis. Moreover, each FIFO may have sub-FIFOs, thus the correction coefficient may be different on a per FIFO and/or per sub-FIFO basis. The correction coefficient's units may be in time per byte and may be different for different types of port elements. In other words, some port elements may be faster that other port elements thus causing different a correction coefficients. The variable delay may be an estimate of the time at which the packet will actually exit the port exit.

One advantage in using FIFO depth is that it may provide for an accurate timestamp irrespective the port element's speed (this is the purpose of co-efficient value) or unpredictable traffic patterns (this is the use of FIFO depth). When FIFO depth is measured in bytes of data outstanding in the downstream FIFO memory, then the correction coefficient may depend on the port element's data rate. Consequently, the variable delay my comprise:

variable delay=FIFO depth*correction coefficient.

The fixed logic delay may add further delay time and may be due to fixed logic within the ASIC for example. The fixed logic delay may model the delay of the path between timestamping logic 210 and any of the port exits (e.g. first port exit 245, second port exit 250, and third port exit 255). The fixed logic delay may be pre-estimated on a per port exit basis. Each exit point may have different delay characteristics, thus the fixed logic delay may be different on a per exit point basis. Moreover, each FIFO may have sub-FIFOs, thus the fixed logic delay may be different on a per FIFO and/or per sub-FIFO basis. In other words, the fixed logic delay may be different depending upon which port exit is used. One example of fixed logic delay may be serializing and de-serializing of data by a SerDes.

Additionally, the FIFO depth feedback may help to accurately estimate a number of packets outstanding to aid in calculating the outstanding packet delay. This may be important because each outstanding packet adds delays due to Inter-Packet Gap (IPG) insertion. Each exit point may have different delay characteristics thus the IPG may be different on a per exit point basis. Moreover, each FIFO may have sub-FIFOs, thus the IPG may be different on a per FIFO and/or per sub-FIFO basis. IPG coefficient may comprise the length in time of the inter-packet Gap. Consequently, the outstanding packet delay my comprise:

outstanding packet delay=number of outstanding packets*IPG coefficient.

Once network device 105 places the timestamp value on the packet in stage 320, method 300 may continue to stage 330 where network device 105 may send the packet to first port element 215 where it is placed in first FIFO memory 230. For example, first port element 215 may place addressing information on the packet according to, for example, the Media Access Control (MAC) protocol.

After network device 105 sends the packet to FIFO memory 230 in stage 330, method 300 may proceed to stage 340 where network device 105 may send the packet from first FIFO memory 230 out first port exit 245. For example, the packet may continue from network device 105 through other network devices in the network until it reaches its ultimate destination. Once network device 105 sends the packet from FIFO memory 230 out port exit 245 in stage 340, method 300 may then end at stage 350.

If port extenders are used to increase the number of ports on network device 105, then embodiments of the disclosure can be extended to account for the delay between the point of timestamping in network device 105 and the egress port on the port extender.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a packet;
   placing a timestamp value on the packet, the timestamp value comprising a place time value comprising a time when the timestamp was placed on the packet plus a delay time value comprising an estimated time delay between when the timestamp was placed on the packet and when the packet leaves a port exit, wherein placing the timestamp value on the packet comprises:
      receiving depth feedback from a first in first out (FIFO) memory indicating the current occupancy of the FIFO memory, and
      calculating the delay time value based upon the received feedback, wherein calculating the delay time value based upon the received feedback comprises multiplying a current FIFO depth as indicated in the received depth feedback by a correction coefficient;
   sending the packet to the FIFO memory; and
   sending the packet from the FIFO memory out the port exit.

2. The method of claim 1, wherein receiving the packet comprises receiving the packet from a central memory.

3. The method of claim 1, wherein placing the timestamp value on the packet comprises placing the timestamp value on the packet at a single, centrally located time stamping logic within an Application Specific Integrated Circuit (ASIC).

4. The method of claim 1, wherein placing the timestamp value on the packet comprises placing the timestamp value on the packet at a single, centrally located time stamping logic within an Application Specific Integrated Circuit (ASIC), the single, centrally located time stamping logic being adjacent a central memory from which the packet was received.

5. The method of claim 1, wherein placing the timestamp value on the packet comprises calculating the delay time value based upon a fixed logic delay comprising an estimated time it takes the packet to pass from a single, centrally located time stamping logic within an Application Specific Integrated Circuit (ASIC) to the port exit.

6. The method of claim 1, wherein placing the timestamp value on the packet comprises calculating the delay time value based upon multiplying a number of outstanding packets by an Inter-Packet Gap (IPG) coefficient.

7. The method of claim 1, wherein placing the timestamp value on the packet comprises placing the timestamp value on the packet by an Application Specific Integrated Circuit (ASIC).

8. The method of claim 1, wherein placing the timestamp value on the packet comprises placing the timestamp value on the packet by a network device.

9. The method of claim 1, wherein placing the timestamp value on the packet comprises placing the timestamp value on the packet by a network device comprising a router.

10. The method of claim 1, wherein placing the timestamp value on the packet comprises placing the timestamp value on the packet by a network device comprising a network switch.

11. An apparatus comprising:
    time stamping logic configured to place a timestamp value on a packet, the timestamp value comprising a place time value comprising a time when the timestamp was placed on the packet plus a delay time value comprising an estimated time delay between when the timestamp was placed on the packet and when the packet leaves a port exit, wherein the time stamping logic being configured to place the timestamp value on the packet comprises the time stamping logic being configured to:
       receive depth feedback from a first in first out (FIFO) memory indicating the current occupancy of the FIFO memory; and
       calculate the delay time value based upon;
          a first factor derived from multiplying a current FIFO depth as indicated in the received depth feedback by a correction coefficient, and
          a fixed logic delay comprising an estimated time it takes the packet to pass from the time stamping logic to the port exit; and a port element comprising the FIFO memory and the port exit, the port element configured to;
  receive the timestamped packet,
  place the timestamped packet into the FIFO memory, and
  send the timestamped packet from the FIFO memory out the port exit.

12. The apparatus of claim 11, further comprising a central memory configured to provide the packet to the time stamping logic.

13. The apparatus of claim 11, wherein the time stamping logic being configured to place the timestamp value on the packet comprises the time stamping logic being configured to calculate the delay time value based upon multiplying a number of outstanding packets by an Inter-Packet Gap (IPG) coefficient.

14. A method comprising:
  placing a timestamp value on a packet, the timestamp value comprising a place time value comprising a time when the timestamp was placed on the packet plus a delay time value comprising an estimated time delay between when the timestamp was placed on the packet and when the packet leaves a port exit, wherein placing the timestamp value on the packet comprises:
    receiving depth feedback from a first in first out (FIFO) memory indicating the current occupancy of the FIFO memory, and
    calculating the delay time value based upon,
      a first factor derived from multiplying a current FIFO depth as indicated in the received depth feedback by a correction coefficient, and
      a fixed logic delay comprising an estimated time it takes the packet to pass from a single, centrally located time stamping logic within an Application Specific Integrated Circuit (ASIC) to the port exit;
  sending the packet to the first in first out (FIFO) memory; and
  sending the packet from the first in first out (FIFO) memory out the port exit.

15. The method of claim 14, further comprising receiving the packet from a central memory.

16. The method of claim 14, wherein placing the timestamp value on the packet comprises placing the timestamp value on the packet at a single, centrally located time stamping logic within an Application Specific Integrated Circuit (ASIC).

17. The method of claim 14, wherein placing the timestamp value on the packet comprises placing the timestamp value on the packet at a single, centrally located time stamping logic within an Application Specific Integrated Circuit (ASIC), the single, centrally located time stamping logic being adjacent a central memory from which the packet was received.

18. The method of claim 14, wherein placing the timestamp value on the packet comprises placing the timestamp value on the packet by an Application Specific Integrated Circuit (ASIC).

19. The method of claim 14, wherein placing the timestamp value on the packet comprises placing the timestamp value on the packet by a network device.

20. An apparatus comprising:
  time stamping logic configured to place a timestamp value on a packet, the timestamp value comprising a place time value comprising a time when the timestamp was placed on the packet plus a delay time value comprising an estimated time delay between when the timestamp was placed on the packet and when the packet leaves a port exit, wherein the time stamping logic being configured to place the timestamp value on the packet comprises the time stamping logic being configured to calculate the delay time value based upon multiplying a number of outstanding packets by an Inter-Packet Gap (IPG) coefficient; and
  a port element comprising a first in first out (FIFO) memory and the port exit, the port element configured to;
    receive the timestamped packet,
    place the timestamped packet into the FIFO memory, and
    send the timestamped packet from the FIFO memory out the port exit.

21. The apparatus of claim 20, further comprising a central memory configured to provide the packet to the time stamping logic.

22. The apparatus of claim 20, wherein the time stamping logic being configured to place the timestamp value on the packet comprises the time stamping logic being configured to calculate the delay time value based upon a fixed logic delay comprising an estimated time it takes the packet to pass from the time stamping logic to the port exit.

* * * * *